(12) United States Patent
Hsia

(10) Patent No.: US 6,447,001 B1
(45) Date of Patent: Sep. 10, 2002

(54) DETACHABLE HAND BAR AND FOOT STEP ARRANGEMENT FOR STROLLER

(76) Inventor: Ben M. Hsia, 19401 Business Center Dr., Northridge, CA (US) 91324

( * ) Notice: Subject to any disclaimer, the term of this patent is extended or adjusted under 35 U.S.C. 154(b) by 0 days.

(21) Appl. No.: 09/729,683

(22) Filed: Dec. 5, 2000

(51) Int. Cl.[7] .................................................. B62B 1/00
(52) U.S. Cl. .................... 280/642; 280/658; 280/47.38; 16/422; 16/426
(58) Field of Search .................... 280/642, 647, 280/643, 648, 649, 650, 657, 658, 47.38, 47.4, 282, 288; D12/129; 16/422, 426

(56) References Cited

U.S. PATENT DOCUMENTS

| | | | | |
|---|---|---|---|---|
| 2,917,316 A | * | 12/1959 | Gill | 280/642 |
| 2,993,702 A | * | 7/1961 | Gill | 280/642 |
| 3,110,504 A | * | 11/1963 | Myers | 280/647 |
| 3,248,125 A | * | 4/1966 | Gill | 280/47.4 |
| 3,309,101 A | * | 3/1967 | Romay | 280/47.38 |
| D319,493 S | * | 8/1991 | Edmondson | D23/284 |
| 5,579,556 A | * | 12/1996 | Chung | 16/114 R |
| 5,622,375 A | * | 4/1997 | Fairclough | 280/642 |
| 5,664,795 A | * | 9/1997 | Haung | 280/47.38 |
| 5,725,238 A | * | 3/1998 | Huang | 280/642 |
| 6,086,087 A | * | 7/2000 | Yang | 280/658 |
| D444,738 S | * | 7/2001 | Lan | D12/129 |
| 6,276,759 B1 | * | 8/2001 | Lan | 301/111 |
| D450,265 S | * | 11/2001 | Hsia | D12/129 |
| 6,312,005 B1 | * | 11/2001 | Lin | 280/647 |

FOREIGN PATENT DOCUMENTS

FR 937752 * 10/1946

* cited by examiner

Primary Examiner—Brian L. Johnson
Assistant Examiner—Bryan Fischmann
(74) Attorney, Agent, or Firm—Raymond Y. Chan; David and Raymond Patent Group

(57) ABSTRACT

A detachable hand bar and foot step arrangement for a stroller for carrying an extra young child standing thereon includes a platform supported between a swinging bar and a back supporting stem of a back frame of the stroller such that a downward force which is the young child's weight applied on the platform is capable of evenly dispensing on the stroller in order to prevent the platform from insupportably breaking. The detachable hand bar is capable of adjusting its angle and location along a handle according to the standing position of the young child such that the young child is able to fitly hold the hand bar in the standing position.

19 Claims, 4 Drawing Sheets

DETACHABLE HAND BAR AND FOOT STEP ARRANGEMENT FOR STROLLER

BACKGROUND OF THE PRESENT INVENTION

1. Field of Invention

The present invention relates to a stroller, and more particularly to a detachable hand bar and foot step arrangement for a stroller wherein a child is able to stand on the foot step or sit on the stroller with different standing or sitting positions respectively.

2. Description of Related Arts

Strollers have been known and sold throughout the United States since stroller becomes a necessity to every family having a young child or baby in which the stroller is considered as a convenience tool to carry the baby or young child during outdoor activities such as jogging or shopping. The conventional stroller contains a foldable structure to reduce its size for storing in the trunk. Referring to FIG. 1 of the drawing, the conventional stroller 10 comprises a front frame 11 comprising a pair of front supporting posts 111 and a U-shaped handle 112 having two ends respectively connected to two top ends of the pair of front supporting posts 111, a back frame 12 comprising a U-shaped back supporting stem 121 having two ends upwardly extended thereof pivotally connected with the front frame 11 by means of a pair of pivot joints 13, a pair of front wheel 14 rotatably mounted on bottom ends of the pair of front supporting posts 111, a pair of back wheels 15 rotatably mounted on a bottom of the back supporting stem 121, a seat frame 16, which comprises a pair of parallel seat supporting bars 161, mounted between the front frame 11 and the back frame 12 for supporting a baby, and a pair of folding joints 17 for connecting the pair of front supporting posts 111 and the two ends of the handle 112 together to form the rigid front frame 11, wherein by operating the folding joints 17, the handle 112 can be folded rearwardly and downwardly towards the back frame 12, so as to fold up the stroller 10 to reduce its size, as shown in FIG. 4.

Usually, a child or baby sits on the seat frame, which faces frontwardly while his or her parent is driving the stroller at its back such that the child may not able to see his or her parent when he or she sits on the stroller. Furthermore, children normally are active that they always like to move around. After they sit on the stroller for a while, they will try to move or stand on the seat. However, it is very dangerous because the young children may get serious injury if they fall down from the stroller. The children start yell and cry if they are ignored on the stroller. Sometimes, they may just want to see their parent's face for secure feelings.

An improved stroller comprises a foot step mounted on the back frame such that the young child is able to stand on the stroller. However, the stroller still has some drawbacks on usage under certain circumstances. For example, U.S. Pat. No. 5,622,375 owned by Fairclough discloses a platform pivotally mounting to rear sloping bars. The front edge of the platform is supported by a pair of straps or springs which are connected between the front corners of the platform and the corresponding bars of the side frame respectively. A pair of rear wheels each having a trailing arm are rotatably mounted to trailing edges of the platform respectively. In such arrangement, the stroller is unstable since the rear wheels are supported by the platform which is merely supported by the straps, the platform will absorb the shock of the stroller while the stroller is being moved. Moreover, the platform may even break since the rear wheels are far from the rear sloping bars, all forces including the child's weight and the partial weight of the stroller will exert on the platform. So, the young child may feel uncomfortable when the platform is shaking or may even get hurt if the platform is insupportably broken.

SUMMARY OF THE PRESENT INVENTION

A main object of the present invention is to provide a detachable hand bar and foot step arrangement for stroller wherein the stroller is capable of carrying an extra young child in a standing position in the foot step arrangement.

Another object of the present invention is to provide a detachable hand bar and foot step arrangement for stroller wherein the downward force of the child's weight applied on the foot step arrangement is evenly dispensed to the stroller so as to prevent the platform from any insupportably breaking.

Another object of the present invention is to provide a detachable hand bar and foot step arrangement for stroller, which does not require to alter the original structure of the stroller, so as to minimize the manufacturing cost of the stroller.

Another object of the present invention is to provide a detachable hand bar and foot step arrangement that is adapted to be installed to various kinds of the stroller.

Another object of the present invention is to provide a detachable hand bar and foot step arrangement for stroller wherein the stroller is adapted to be folded up for easy storage and transportation.

Accordingly, in order to accomplish the above objects, the present invention provides a detachable hand bar and foot step arrangement for a stroller which comprises a supporting frame comprising a front frame and a back frame, a seat frame supported by the front frame and the back frame, and a handle upwardly extended from the supporting frame, wherein the detachable hand bar and foot step arrangement comprises:

a U-shaped hand bar for a young child holding on the stroller in a standing position, comprising an adjusting means mounted on each end of the hand bar for detachably locking the hand bar on the handle of the stroller and for pivotally adjusting a position of the hand bar on the handle; and a foot step arrangement, which is mounted on the back frame of the stroller, for supporting the young child in the standing position, comprising a pair of supporting arms integrally and rearwardly extended from the seat frame, a U-shaped swinging bar having two ends pivotally connected to the pair of supporting arms by a pair of pivot joints respectively, and a platform horizontally supported between the back supporting stem and the swinging bar.

DETAILED DESCRIPTION OF THE PREFERRED EMBODIMENT

Figure 1:
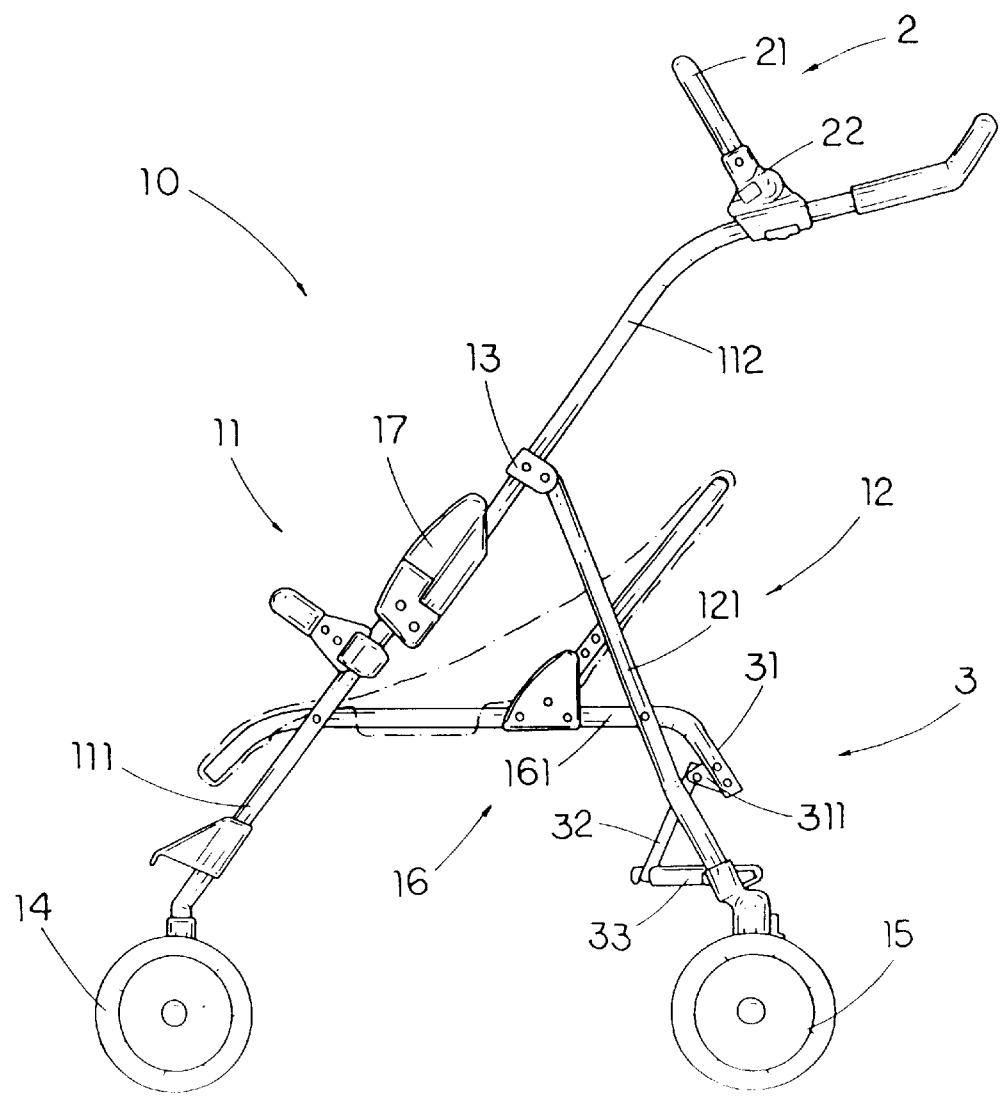
FIG. 1 is a side view of a stroller having a detachable hand bar and foot step arrangement according to a preferred embodiment of the present invention.
Figure 2:
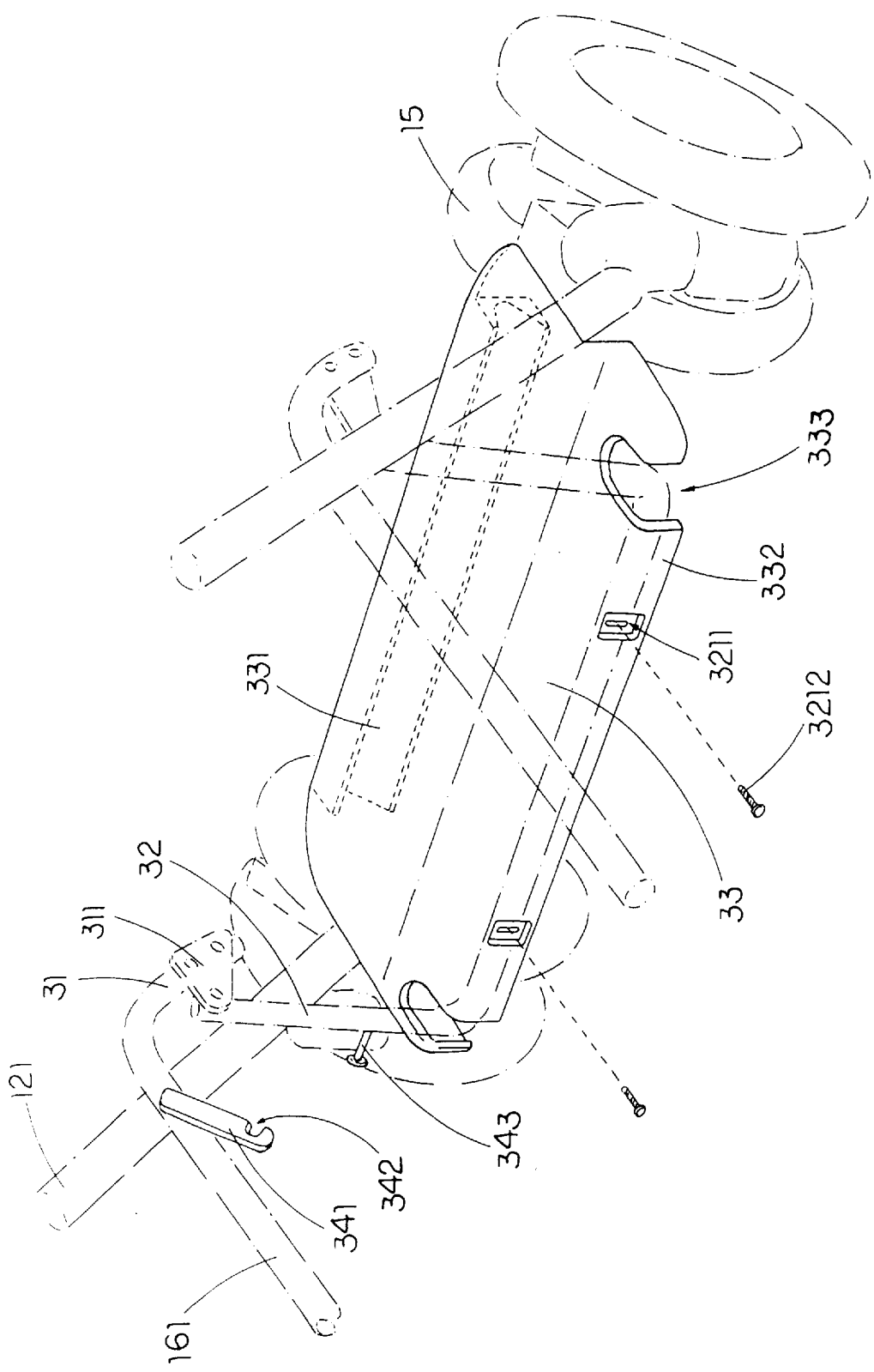
FIG. 2 is a partial perspective view of the foot step arrangement according to the above preferred embodiment of the present invention.

Referring to FIGS. 1 and 2 of the drawings, a detachable U-shaped hand bar 21 and foot step arrangement 3 adapted for mounting on a stroller 10 according to a preferred embodiment of the present invention is illustrated. As mentioned in the background of the present invention, the stroller 10 comprises a supporting frame comprising a front frame 11 having a pair of front wheels 14 and a back frame 12 having a U-shaped back supporting stem 121 for rotatably mounting the pair of rear wheels 15 thereon, a seat frame 16, which is supported by the front frame 11 and the back frame 12, having a pair of parallel seat supporting bars 161 for supporting a baby, and a U-shaped handle 112 upwardly extended from the supporting frame.

Referring to FIG. 2, the foot step arrangement 3, which is slidably mounted on the back frame 12 of the stroller 10, comprises a pair of supporting arms 31 integrally and rearwardly extended from the seat frame 16 of the stroller 10 respectively, a U-shaped swinging bar 32 having two ends pivotally connected to the pair of supporting arms 31 by a pair of pivot joints 311 respectively, and a platform 33 horizontally supported between the back frame 12 and the swinging bar 32.

The hand bar 21 is detachably mounted on the handle 112 of the stroller 10 and for providing a handle for a young child standing on the platform 33 of the foot step arrangement 3. The hand bar 2 comprises an adjusting means 20 mounted on each end of the hand bar 21 for detachably locking the hand bar 21 on the handle .112 and for pivotally adjusting the hand bar 21 on the handle 112.

Each supporting arm 31 is integrally and rearwardly extended from each of the parallel seat supporting bars 161 of the seat frame 16 and is gradually extended downward such that a free end of each supporting arm 31 is suspended downwardly therefrom. The U-shaped swinging bar 32 has two ends upwardly extended therefrom wherein each end of the swinging bar 32 is pivotally connected to each supporting arm 31 at its suspended free end by a pivot joint 311 such that the swinging bar 32 is suspended downwardly from the supporting arms 31.

According to the preferred embodiment of the present invention, each of the pivot joints 311, which is adapted for pivotally connecting between the swinging bar 32 and the supporting arm 31, comprises a triangular strengthened metal piece. Two end portions of each pivot joint 311 are firmly mounted on the supporting arm 31, and another extending end portion of the pivot joint 311 is frontwardly and pivotally connected to the swinging bar 32. So, in such arrangement, the swinging bar 32 is capable of swinging between a vertical position and a folding position which is underneath the stroller 10.

The platform 33 having a rectangular shaped is horizontally supported between the back supporting stem 121 and the swinging bar 32 in an open position of the stroller 10. The platform 33 comprises a U-shaped holding hinge 331 and an elongated blocking wall 332. The holding hinge 331 is mounted on a rear bottom edge of the platform 33 wherein an opening of the holding hinge 331 is faced frontwardly. The holding hinge 331 of the platform 33 is detachably engaged from its opening with the bottom portion of the supporting stem 121 of the back frame 12 in such manner the platform 33 is hooked on the supporting stem 121 when the stroller 10 is in the open position. The blocking wall 332 is downwardly extended from a front bottom edge of the platform 33 wherein the blocking wall 332 is movably connected to a bottom portion of the swinging bar 32 by a pair of pin joints 321 such that the platform 33 is capable of slightly moving in vertical position. A pair of arc-shaped sliding slots 333 are respectively mounted on two front corners of the platform 33 wherein two sides of the swinging bar 32 are slidably mounted on the sliding slots 333 respectively such that the swinging bar 32 is capable of swinging between a vertical position and a folding position along the sliding slots 333.

Accordingly, the pin joints 321 have a pair of elongated through holes 3211 and a pair of elongated pins 3212 respectively. The two elongated through holes 3211 are vertically mounted on the blocking wall 332 respectively wherein the two elongated pins 3212 are respectively penetrated through the two through holes 3211 and connected to the supporting stem 121 such that the platform 33 is adapted to have slightly movement along the through holes 3211 for easily adjusting the platform 33 engage with the supporting stem 121.

Figure 4:
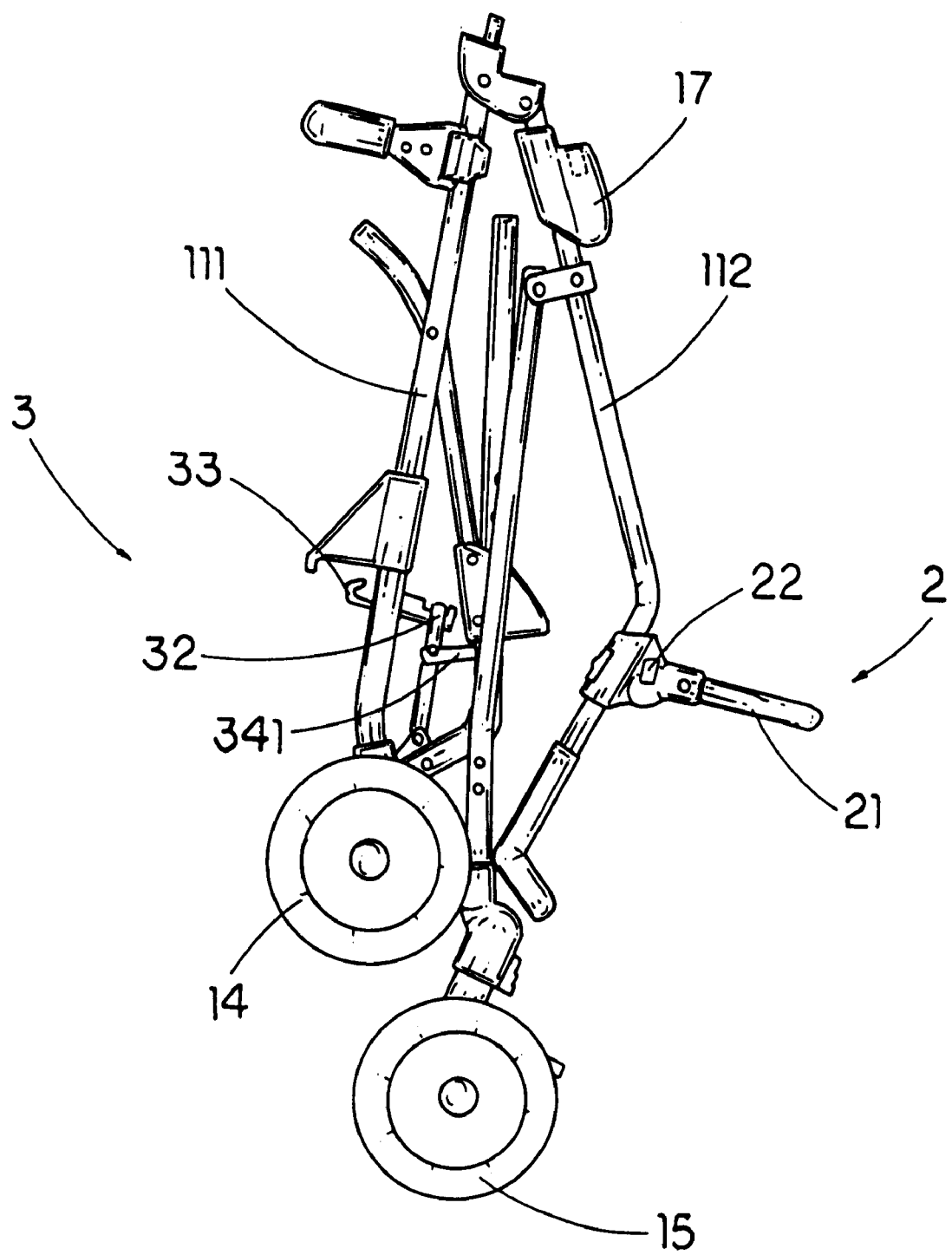
FIG. 4 is a perspective view of the detachable hand bar and foot step arrangement according to preferred embodi-

The foot step arrangement 3 further comprises a holding means 34 for holding the foot step arrangement 3 in a closed position wherein the holding means 34 comprises a holding latch 341 having a catch 342 pivotally connected to the seat frame 16 wherein the catch 342 is adapted for detachably engaging with the holding rivet 343 which is affixed on the swinging bar 32. The holding rivet 343 is affixedly protruded from a respective side of the swinging bar 32 such that when the swinging bar 32 is being swung forward, the catch 342 of the holding latch 341 is fittingly hooked on the holding rivet 343 so as to fold the foot step arrangement 3 towards to the stroller 10 in the closed position, as shown in FIG. 4.

Figure 3:
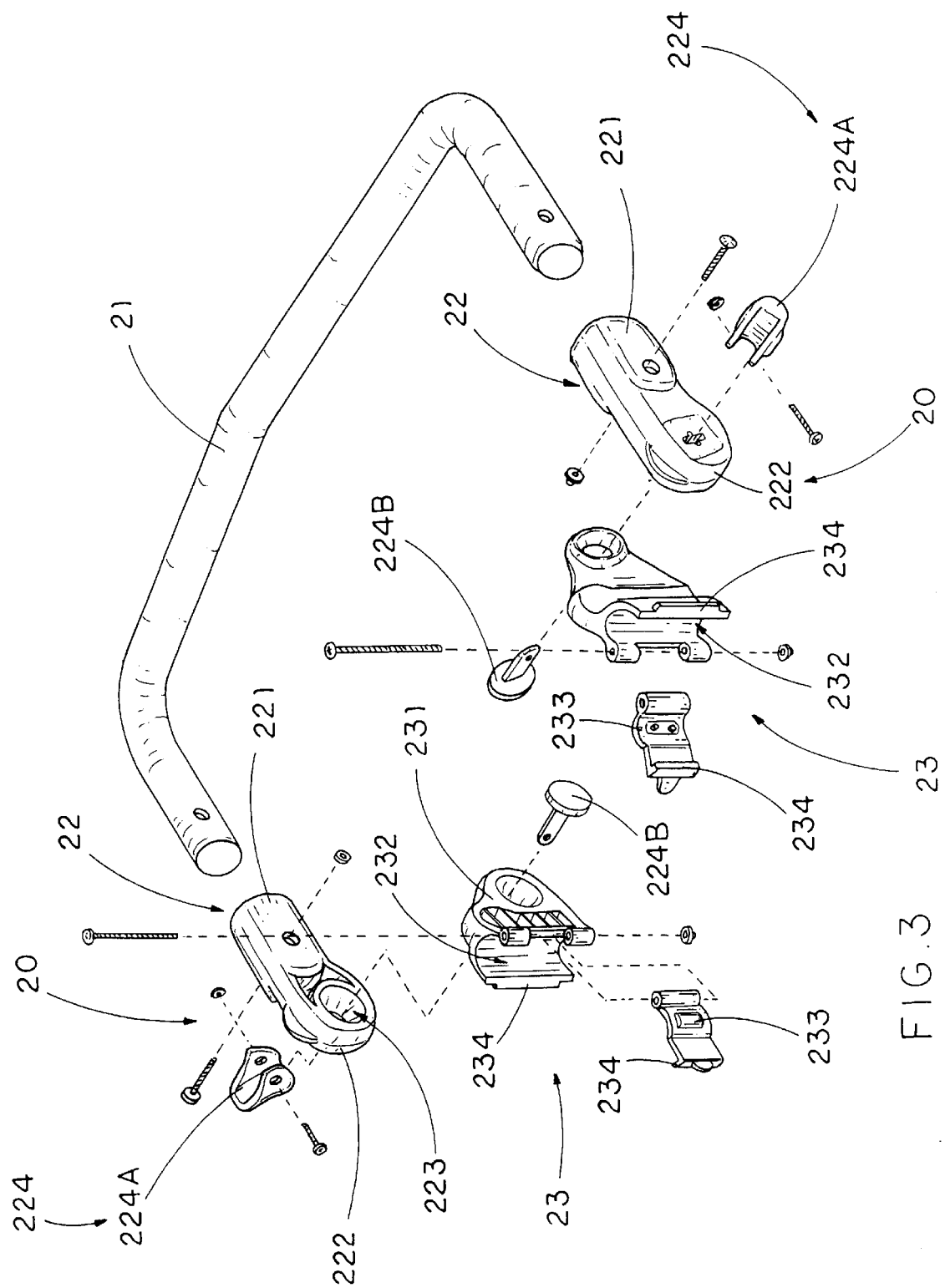
FIG. 3 is a perspective view of the detachable hand bar according to the above preferred embodiment of the present invention.

Referring to FIG. 3, the hand bar 21 has a predetermined width equal to a width of the handle 112 of the stroller 10 wherein the hand bar 21 is adjustably and perpendicularly attached on the U-shaped handle 112.

The adjusting means 20 comprises a pair of bar holders 22 securely affixed at two ends of the hand bar 21 respectively, and a pair of bar lockers 23 each pivotally connected to the bar holder 22 for detachably locking the hand bar 21 on the handle 112 in position. Each bar holder 22 has a tubular upper portion 221 and a lower position 222 integrally extended from the upper portion 221 thereof wherein the upper portion 221 of the bar holder 22 has an inner diameter slightly bigger than a diameter of the hand bar 21 such that each end of the hand bar 21 is securely inserted into the upper portion 222. A circular pivot cavity 223 is provided on the lower portion 222 of the bar holder 22 for rotatably receiving the bar locker 23.

Each bar locker 23 comprises a locking arm 231 having a rotor rear end 235 rotatably received in the pivot cavity 223, a C-shaped bar slot 232 formed on a front end of the locking arm 231 for fitly engaging with the handle 112, and a pivot door 233 for pivotally enclosing the bar slot 232. A pair of corresponding locking protrusions 234 extended from an edge the bar slot 232 and an edge of the pivot door 233 respectively such that the pivot door 233 is adapted for engaging with the bar slot 232 by the two locking protrusions 234 for securely holding the handle 112 in position.

Each bar locker 23 further comprises a locking button 224 having an operating button 224A and a locker member 224B having a shaft extended to the operating button 224A through the pivot cavity 223 wherein the locking button 224 is used to lock up the hand bar 21 from rotation with respect to the handle 112 by means of the operating button 224A.

So, the hand bar 21 is adapted for detachably mounted along the handle 112 by attaching the bar lockers 23 thereto wherein the hand bar 21 is adapted for rotating about the pivot axle 235 such that the different locations and angles of the hand bar 21 can be fitly adjusted with respect to the handle 112 for providing a better position to a young child to handle.

In view of above, the present invention can substantially achieve the following advantages:

1. The stroller can carry an extra young child in a standing position such that the young child is able to safety stand on the foot step arrangement with the hand bar.

2. The foot step arrangement is directly supported by the back frame of the stroller to form a rigid structure such that the downward force which is the weight of the young child is evenly dispensed from the platform to the stroller so as to prevent the platform from any insupportably breaking.

3. The detachable hand bar is capable of adjusting its location along the handle of the stroller according to different standing positions of the young child. In other words, the hand bar can be adjusted to fit the young child having different height or standing positions.

4. The foot step arrangement can be folded up when the stroller is collapsed so as to easy storage and transportation.

5. The foot step arrangement is adapted to be installed to any kind of the stroller, so as to minimize the manufacturing cost of the stroller employed with the foot step arrangement.

What is claimed is:

1. A detachable hand bar and foot step arrangement for a stroller which comprises a supporting frame comprising a front frame, a back frame having a back supporting stem, a seat frame supported by said front frame and said the back frame, and a handle upwardly extended from said supporting frame, wherein said detachable hand bar and foot step arrangement comprises:

a U-shaped hand bar comprising an adjusting means mounted on each end of said hand bar for detachably locking said hand bar on said handle of said stroller and for pivotally adjusting a position of said hand bar on said handle; and a foot step arrangement, which is mounted on said back frame of said stroller, for supporting said young child in said standing position, comprising:

a pair of supporting arms integrally and rearwardly extended from said seat frame of said stroller;

a U-shaped swinging bar having two ends pivotally connected to said pair of supporting arms by a pair of pivot joints respectively such that said swinging bar is downwardly suspended from said supporting arms in a swinging manner; and a platform, which is horizontally supported between said swinging bar and said back supporting stem of said back frame of said stroller, comprises:

a holding hinge affixed on a rear bottom edge thereof for hooking on said back supporting stem; and a blocking wall downwardly extended from a front bottom edge of said platform wherein said blocking wall is movably connected to a bottom portion of said swinging bar by a pair of pin joints, wherein a pair of arc-shaped sliding slots are mounted on two front corners of said platform respectively in such a manner said swinging bar is capable of swinging between a vertical position and a folding position along said sliding slots.

2. The detachable hand bar and foot step arrangement, as recited in claim 1, wherein said pin joints comprise two elongated through holes vertically mounted on said blocking wall respectively and two elongated pins respectively penetrating through said two through holes for connecting between said back supporting stem and said platform such that said platform is adapted to have slightly movement along said through holes.

3. The detachable hand bar and foot step arrangement, as recited in claim 2, wherein said adjusting means comprises a pair of bar holders securely affixed at two ends of said hand bar respectively and a pair of bar lockers each pivotally connected to said bar holder for detachably locking said hand bar on said handle in position, wherein each of said bar holders has a tubular upper portion having an inner diameter slightly bigger than a diameter of said hand bar and each end of said hand bar is securely inserted into said upper portion of said bar holder and a circular pivot cavity provided on a lower portion of said bar holder for rotatably connecting with said bar locker.

4. The detachable hand bar and foot step arrangement, as recited in claim 3, wherein each said pivot joint comprises a strengthened metal piece having at least one end thereof firmly mounted on said supporting arm and another end of said metal piece outwardly extended and pivotally connected to said swinging bar.

5. The detachable hand bar and foot step arrangement, as recited in claim 3, wherein each bar locker having a rotor rear end rotatably received in said pivot cavity, a C-shaped bars lot formed on a front end of said locking arm for engaging with said handle, a pivot door for pivotally enclosing said bar slot, and a locking button having an operating button and a locker member having a shaft extended to said operating button through said pivot cavity wherein said locking button is adapted for locking up said rotation of said hand bar on said handle.

6. The detachable hand bar and foot step arrangement, as recited in claim 5, further comprises a holding means for holding said foot step arrangement in a closed position wherein said holding means comprises a holding latch having a catch pivotally connected to said seat frame and a holding rivet affixedly protruded from said swinging bar such that when said swinging bar is being swung forward, said catch of said holding latch is adapted for fitly engaging with said holding rivet.

7. The detachable hand bar and foot step arrangement, as recited in claim 6, wherein each said pivot joint comprises a strengthened metal piece having at least one end thereof firmly mounted on said supporting arm and another end of said metal piece outwardly extended and pivotally connected to said swinging bar.

8. The detachable hand bar and foot step arrangement, as recited in claim 7, wherein each said bar locker further comprises a pair of corresponding locking protrusions extended from an edge said bar slot and an edge of said pivot door respectively such that said pivot door is adapted for engaging with said bar slot by said two locking protrusions for securely holding said handle in position.

9. The detachable hand bar and foot step arrangement, as recited in claim 6, wherein each said bar locker further comprises a pair of corresponding locking protrusions extended from an edge said bar slot and an edge of said pivot door respectively such that said pivot door is adapted for engaging with said bar slot by said two locking protrusions for securely holding said handle in position.

10. The detachable hand bar and foot step arrangement, as recited in claim 5, wherein each said pivot joint comprises a strengthened metal piece having at least one end thereof firmly mounted on said supporting arm and another end of said metal piece outwardly extended and pivotally connected to said swinging bar.

11. The detachable hand bar and foot step arrangement, as recited in claim 5, wherein each said bar locker further comprises a pair of corresponding locking protrusions extended from an edge said bar slot and an edge of said pivot door respectively such that said pivot door is adapted for engaging with said bar slot by said two locking protrusions for securely holding said handle in position.

12. The detachable hand bar and foot step arrangement, as recited in claim 1, wherein said adjusting means comprises a pair of bar holders securely affixed at two ends of said hand bar respectively and a pair of bar lockers each pivotally connected to said bar holder for detachably locking said hand bar on said handle in position, wherein each of said bar holders has a tubular upper portion having an inner diameter slightly bigger than a diameter of said hand bar and each end of said hand bar is securely inserted into said upper portion of said bar holder and a circular pivot cavity provided on a lower portion of said bar holder for rotatably connecting with said bar locker.

13. The detachable hand bar and foot step arrangement, as recited in claim 12, wherein each bar locker having a rotor rear end rotatably received in said pivot cavity, a C-shaped bar slot formed on a front end of said locking arm for engaging with said handle, a pivot door for pivotally enclosing said bar slot, and a locking button having an operating button and a locker member having a shaft extended to said operating button through said pivot cavity wherein said locking button is adapted for locking up said rotation of said hand bar on said handle.

14. A detachable hand bar and foot step arrangement for a stroller which comprises a supporting frame comprising a front frame, a back frame having a back supporting stem, a seat frame supported by said front frame and said the back frame, and a handle upwardly extended from said supporting frame, wherein said detachable hand bar and foot step arrangement comprises:

a U-shaped hand bar comprising an adjusting means mounted on each end of said hand bar for detachably locking said hand bar on said handle of said stroller and for pivotally adjusting a position of said hand bar on said handle; and a foot step arrangement, which is mounted on said back frame of said stroller, for supporting said young child in said standing position, comprising:

a pair of supporting arms integrally and rearwardly extended from said seat frame of said stroller;

a U-shaped swinging bar having two ends pivotally connected to said pair of supporting arms by a pair of pivot joints respectively such that said swinging bar is downwardly suspended from said supporting arms in a swinging manner; and a platform horizontally supported between said swinging bar and said back supporting stem of said back frame of said stroller;

wherein said adjusting means comprises a pair of bar holders securely affixed at two ends of said hand bar respectively and a pair of bar lockers each pivotally connected to said bar holder for detachably locking said hand bar on said handle in position, wherein each of said bar holders has a tubular upper portion having an inner diameter slightly bigger than a diameter of said hand bar and each end of said hand bar is securely inserted into said upper portion of said bar holder and a circular pivot cavity provided on a lower portion of said bar holder for rotatably connecting with said bar locker.

15. The detachable hand bar and foot step arrangement, as recited in claim 14, wherein each bar locker having a rotor rear end rotatably received in said pivot cavity, a C-shaped bar slot formed on a front end of said locking arm for engaging with said handle, a pivot door for pivotally enclosing said bar slot, and a locking button having an operating button and a locker member having a shaft extended to said operating button through said pivot cavity wherein said locking button is adapted for locking up said rotation of said hand bar on said handle.

16. The detachable hand bar and foot step arrangement, as recited in claim 14, further comprises a holding means for holding said foot step arrangement in a closed position wherein said holding means comprises a holding latch having a catch pivotally connected to said seat frame and a holding rivet affixedly protruded from said swinging bar such that when said swinging bar is being swung forward, said catch of said holding latch is adapted for fitly engaging with said holding rivet.

17. The detachable hand bar and foot step arrangement, as recited in claim 14, further comprises a holding means for holding said foot step arrangement in a closed position wherein said holding means comprises a holding latch having a catch pivotally connected to said seat frame and a holding rivet affixedly protruded from said swinging bar such that when said swinging bar is being swung forward, said catch of said holding latch is adapted for fitly engaging with said holding rivet.

18. A detachable hand bar and foot step arrangement for a stroller which comprises a supporting frame comprising a front frame, a back frame having a back supporting stem, a seat frame supported by said front frame and said the back frame, and a handle upwardly extended from said supporting frame, wherein said detachable hand bar and foot step arrangement comprises:

a U-shaped hand bar comprising an adjusting means mounted on each end of said hand bar for detachably locking said hand bar on said handle of said stroller and for pivotally adjusting a position of said hand bar on said handle; and a foot step arrangement, which is mounted on said back frame of said stroller, for supporting said young child in said standing position, comprising:

a pair of supporting arms integrally and rearwardly extended from said seat frame of said stroller;

a U-shaped swinging bar having two ends pivotally connected to said pair of supporting arms by a pair of pivot joints respectively such that said swinging bar is downwardly suspended from said supporting arms in a swinging manner;

a platform horizontally supported between said swinging bar and said back supporting stem of said back frame of said stroller; and a holding means for holding said foot step arrangement in a closed position wherein said holding means comprises a holding latch having a catch pivotally connected to said seat frame and a holding rivet affixedly protruded from said swinging bar such that when said swinging bar is being swung forward, said catch of said holding latch is adapted for engaging with said holding rivet.

19. The detachable hand bar and foot step arrangement, as recited in claim 18, further comprising at least on bar locker which comprises a pair of corresponding locking protrusions extended from an edge of a bar slot and an edge of a pivot door respectively such that said pivot door is adapted for engaging with said bar slot by said two locking protrusions for securely holding said handle in position.

* * * * *